United States Patent
Keser et al.

(10) Patent No.: US 10,050,316 B2
(45) Date of Patent: Aug. 14, 2018

(54) COMMUNICATION BETWEEN BATTERY CELLS

(71) Applicant: Infineon Technologies AG, Neubiberg (DE)

(72) Inventors: Goran Keser, Munich (DE); Dirk Hammerschmidt, Villach (AT); Werner Roessler, Neufahrn (DE)

(73) Assignee: Infineon Technologies AG, Neubiberg (DE)

( * ) Notice: Subject to any disclaimer, the term of this patent is extended or adjusted under 35 U.S.C. 154(b) by 139 days.

(21) Appl. No.: 15/154,504

(22) Filed: May 13, 2016

(65) Prior Publication Data
US 2017/0331159 A1 Nov. 16, 2017

(51) Int. Cl.
*H01M 10/42* (2006.01)
*H01M 10/48* (2006.01)

(52) U.S. Cl.
CPC ..... *H01M 10/4257* (2013.01); *H01M 10/482* (2013.01); *H01M 2010/4271* (2013.01); *H01M 2010/4278* (2013.01); *H01M 2220/20* (2013.01)

(58) Field of Classification Search
USPC .................................................. 324/425–450
See application file for complete search history.

(56) References Cited

U.S. PATENT DOCUMENTS

| 2015/0115868 A1* | 4/2015 | Ping | H02J 7/34 320/101 |
| 2016/0018319 A1* | 1/2016 | Hegyi | G02B 6/12009 356/73.1 |
| 2016/0061906 A1* | 3/2016 | Cho | G01R 31/3658 324/434 |

OTHER PUBLICATIONS

Tytgat et al., "A plastic waveguide receiver in 40nm CMOS with on-chip bondwire antenna," Proceedings of the ESSCIRC, IEEE, Sep. 16-20, 2013, 4 pp.
Reynaert et al., "RF-through-Plastics," KU Leuven, Nov. 17, 2015, 30 pages.

* cited by examiner

*Primary Examiner* — Vincent Q Nguyen
(74) *Attorney, Agent, or Firm* — Shumaker & Sieffert, P.A.

(57) ABSTRACT

A system includes a battery and a plurality of integrated circuits. The battery includes a plurality of battery cells. Each integrated circuit of the plurality of integrated circuits is coupled to a respective battery cell of the plurality of battery cells. Each integrated circuit includes at least one sensor configured to determine one or more operational characteristics of the battery cell coupled to the integrated circuit, and a transceiver configured to output a signal indicative of the one or more operational characteristics of the battery cell.

19 Claims, 5 Drawing Sheets

COMMUNICATION BETWEEN BATTERY CELLS

TECHNICAL FIELD

This disclosure relates to battery cells, and more particularly, to systems and methods associated with communication between battery cells.

BACKGROUND

Electric vehicles include batteries that provide power to a motor and other components of the electric vehicle. A battery may include a plurality (e.g., tens, hundreds, or thousands) of individual battery cells coupled in series and/or parallel to provide various amounts of current and/or voltage. The electric vehicle may include a battery management/monitoring system (BMS) which may receive operational data about the battery from a battery sensor. The BMS may monitor the data received from the battery sensor, which may be used to control charging and discharging of the battery.

SUMMARY

This disclosure is directed to systems and methods that facilitate communication between battery cells of a battery and a battery management/monitoring system (BMS). The described techniques may utilize one or more sensors to facilitate battery monitoring and one or more transceivers to facilitate communication of sensed conditions. In some examples, one or more waveguides are used for the communication channel.

In one example, a system includes a battery comprising a plurality of battery cells; and a plurality of integrated circuits, wherein each integrated circuit of the plurality of integrated circuits is coupled to a respective battery cell of the plurality of battery cells, and wherein each integrated circuit comprises: at least one sensor configured to determine one or more operational characteristics of the battery cell coupled to the integrated circuit; and a transceiver configured to output a signal indicative of the one or more operational characteristics of the battery cell.

In another example, a method includes determining, by at least one sensor of each respective integrated circuit of a plurality of integrated circuits that are each coupled to a respective battery cell of a plurality of battery cells, one or more operational characteristics of the respective battery cell of a plurality of battery cells; and outputting, by a transceiver of each respective integrated circuit, a signal indicative of the one or more operational characteristics of the respective battery cell.

The details of one or more examples of the disclosure are set forth in the accompanying drawings and the description below. Other features, objects, and advantages will be apparent from the description and drawings, and from the claims.

DETAILED DESCRIPTION

Figure 1:
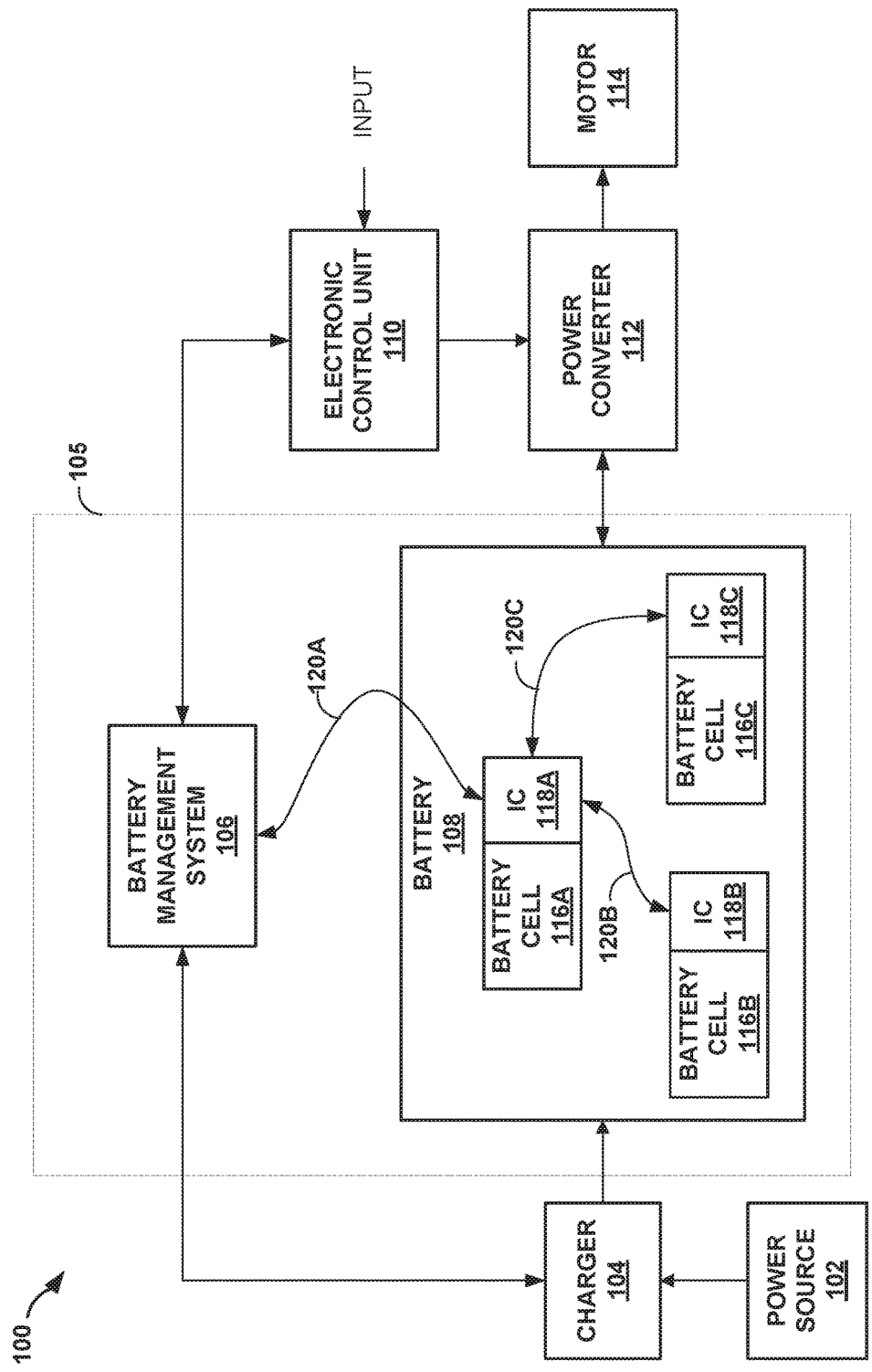
FIG. 1 is a conceptual block diagram illustrating an example system that includes a battery system, in accordance with one or more aspects of this disclosure.

In general, this disclosure is directed to systems and methods that facilitate communication between battery cells of a battery and a battery management/monitoring system (BMS). A battery may include many (tens, hundreds, or more) battery cells connected in various combinations of series and/or parallel connections. In contrast to some techniques which may only monitor operational characteristics of the entire battery, in some examples, a BMS may monitor the operational characteristics of each battery cell in a battery. For example, each battery cell may be coupled to an integrated circuit that includes one or more sensors that determine the operational characteristics (e.g., current, voltage, temperature, state of charge (SOC), etc.) of the battery cell. Each integrated circuit may send data indicative of the operational characteristics of the respective battery cells to a BMS. By coupling an integrated circuit to each battery cell and sending the data indicative of the operational characteristics of the respective battery cells to the BMS, the BMS may enable more optimal control of the charging and discharging of the battery.

In some examples, because each battery cell may send data to the BMS, the amount of data transmitted to the BMS may be rather large. Further, because a large number of battery cells may be connected in series and each battery cell may be coupled to a respective integrated circuit, if the integrated circuits are connected to one another, the voltage differential across each integrated circuit may be very large which may damage or destroy the integrated circuits. Thus, each integrated circuit may be galvanically isolated in order to prevent damaging or destroying the integrated circuits.

Galvanic isolation may be achieved by positioning a capacitor between each integrated circuit. Using capacitors may reduce or eliminate the risk of damaging the integrated circuits when transmitting information indicative of the operational characteristics of each battery cell to the BMS. However, using capacitors to provide galvanic isolation of the integrated circuits may slow the transmission of data. Galvanic isolation may also be achieved by using optocouplers to communicate data between the integrated circuits and the BMS. While optocouplers may enable data to be transmitted faster than capacitors, optocouplers are relatively expensive.

In accordance with one or more techniques of this disclosure, one or more waveguides may be used to enable communication between galvanically isolated components. For instance, one or more waveguides may be used to enable communication between galvanically isolated integrated circuits and the BMS by guiding electromagnetic signals between the integrated circuits and the BMS. As one example, each integrated circuit may include a transceiver configured to output a signal indicative of one or more operational characteristics of the respective battery cells via one or more waveguides. In some examples, because the one or more waveguides may be made of an electrical insulating material (e.g., plastic), the inclusion of the waveguides does not compromise the galvanic isolation. In this way, the integrated circuits coupled to the battery cells may transmit signals indicative of the operational characteristics of the battery cells to the BMS while remaining galvanically isolated from the one another. In addition, waveguides may be relative cheap compared to optocouplers. Further, waveguides may enable the integrated circuits to transmit large amounts of data more quickly compared to using capacitors for galvanic isolation.

FIG. 1 is a conceptual block diagram illustrating an example system that includes a battery system, in accordance with one or more aspects of this disclosure. As illustrated in FIG. 1, system 100 includes power source 102, charger 104, battery system 105, electronic control unit (ECU) 110, power converter 112, motor 114, and a plurality of waveguides 120A-120C (collectively, "waveguides 120"). In some examples, system 100 may include a vehicle, such as an electrical vehicle (EV), such as a plug-in electrical vehicle (PEV), a hybrid electric vehicle, a plug-in hybrid vehicle (PHEV), and the like. FIG. 1 shows system 100 as having separate and distinct components, however system 100 may include additional or fewer components. For instance, power source 102, charger 104, battery system 105, electronic control unit (ECU) 110, power converter 112, motor 114, and waveguides 120 may be individual components or may represent a combination of one or more components that provide the functionality of system 100 as described herein.

System 100 may include power source 102 which provides electrical power to charger 104. Numerous examples of power source 102 exist and may include, but are not limited to, power grids, generators, transformers, batteries, solar panels, windmills, regenerative braking systems, hydro-electrical or wind-powered generators, or any other form of devices that are capable of providing electrical power to charger 104.

Battery system 105 may include BMS 106 and battery 108. BMS 106 may monitor battery 108 and may provide information about battery 108 to charger 104, ECU 110, or both. For example, BMS 106 may provide information about the operational characteristics of battery 108 (e.g., current, voltage, temperature, state of charge (SOC), etc.) to charger 104. For instance, BMS 106 may output a signal to charger 104 indicating that battery 108 has a partial charge remaining. Responsive to receiving the signal indicative of the operational characteristics of battery 108, charger 104 may convert power from power source 102 to a current in order to recharge battery 108.

In some examples, ECU 110 may control operation of motor 114 based on information received from BMS 106 and other sources, such as an ignition switch, a gas pedal, a brake pedal, motor 114, or any combination thereof. For example, ECU 110 may receive a signal indicative of the operational characteristics of battery 108 from BMS 106 and a signal indicative of the current speed and/or position of a rotor of motor 114. In response to receiving a command to accelerate from a gas pedal, ECU 110 may determine the amount of power available in battery 108 based on the signal received from BMS 106 and may cause power converter 112 to increase power to motor 114.

System 100 includes power converter 112 which operates as a switch-based power converter that converts one form of electrical power provided by battery 108 into a different, and usable form, of electrical power for powering motor 114. Power converter 112 may include an AC-to-DC converter, a DC-to-DC converter, or a DC-to-AC converter. Power converter 112 may be a step-up converter that outputs power with a higher voltage level than the voltage level of input power received by the step-up converter. One example of such step-up converter may be referred to as a boost converter. Power converter 112 may instead comprise a step-down converter configured to output power with a lower voltage level than the voltage level of input power received by the step-down converter. One example of such a step-down converter may be referred to as a buck converter. In still other examples, power converter 112 may be a step-up and step-down converter (e.g., a buck-boost converter) that is capable of outputting power with a voltage level that is higher or lower level than the voltage level of the power input received by the step-up and step-down converter.

Motor 114 may include an electric motor that includes a shaft, rotor, stator, and permanent magnet. For example, motor 114 may include a permanent magnet synchronous motor, a brushed DC motor, a brushless DC motor, multi-pole-pair motor, or other type of electric motor. In some examples, motor 114 includes a sensorless electric motor. For example, a sensorless motor does not include sensors to monitor the stator currents, or the speed, direction, or position of the rotor.

Battery 108 may include a plurality of battery cells 116A-116C (collectively, "battery cells 116"). For ease of illustration only, battery 108 is shown with three battery cells 116. However, battery 108 may include tens, hundreds, or even thousands of battery cells 116. Battery cells 116 may be rechargeable and may include lead-acid based battery cells, nickel-metal hydride based battery cells, lithium-ion based battery cells, or the like. In some examples, battery cells 116 may include a relatively small voltage, for example, between approximately one volt and approximately five volts. For example, battery 108 may include many battery cells 116 that each include a voltage of approximately 3.6 volts. In other examples, battery cells 116 may each include larger voltage (e.g., 10 volts, 25 volts, 50 volts, 100 volts, etc.).

Battery 108 may include a plurality of integrated circuits 118A-118C (collectively, "integrated circuits 118" or "ICs 118"). Each battery cell 116 may be coupled to a respective integrated circuit of the plurality of integrated circuits 118. Each integrated circuit 118 may include at least one sensor configured to determine one or more operational characteristics (e.g., current, voltage, temperature, state of charge, or the like.) of the battery cell 116 to which the integrated circuit 118 is coupled. In some examples, each integrated circuit 118 may include a transceiver that is configured to output a signal indicative of the one or more operational characteristics of the respective battery cells 116.

In some examples, integrated circuits 118 may communicate with one another, with BMS 106, or both. However, as it may be desirable for integrated circuits 118 to be galvanically isolated from one another and BMS 106, in some examples, integrated circuits 118 may not communicate with one another or BMS 106 via a direct electrical connection. In accordance with one or more techniques of this disclosure, integrated circuits 118 may communicate with one another or BMS 106 via one or more of waveguides. In some examples, system 100 may include a plurality of waveguides 120. Waveguides 120 may couple integrated circuits 118 to one another, to BMS 106, or both. For example, as illustrated in FIG. 1, waveguide 120A may couple BMS 106 to integrated circuit 118A, waveguide 120B may couple integrated circuit 118A to integrated circuit 118B, and waveguide 120C may couple integrated circuit 118A to integrated circuit 118C. Each integrated circuit 118 may output a signal indicative of the one or more operational characteristics of the respective battery cells 116. For example, integrated circuit 118C may output a signal indicative of the current, voltage, temperature, SOC, or other operational characteristic of battery cell 116C. Integrated circuit 118A may receive the signal from integrated circuit 118C and may forward the signal to BMS 106. Similarly, integrated circuits 118A and 118B may output signals indicative of the one or more operational characteristics of battery cells 116A and 116B, respectively. BMS 106 may receive the signals indicative of the one or more operational characteristics from each integrated circuit 118 directly or via another integrated circuit 118. For example, BMS 106 may receive signals from integrated circuits 118B, 118C via integrated circuit 118A. In this way, integrated circuits 118 may communicate with one another or with BMS 106 while remaining galvanically isolated from one another and BMS 106.

In some examples, the communication between integrated circuits 118 and BMS 106 may be bi-directional. For instance, not only may BMS 106 receive signals from integrated circuits 118, BMS 106 may output signals to integrated circuits 118. For example, BMS 106 may request data from one or more integrated circuits 118 (e.g., a request to re-send data or send additional data). In another example, BMS 106 may send a software or firmware update to one or more integrated circuits 118 (e.g., to update an algorithm for determine the SOC of a battery cell 116). In yet another example, BMS 106 may output a command that causes an actuator to connect a particular integrated circuit 118 to a respective battery cell 116 or to another integrated circuit 118 (or disconnect a particular integrated circuit 118 from a battery cell 116 or integrated circuit 118). In this way, BMS 106 may output signals to integrated circuits 118 while remaining galvanically isolated from integrated circuits 118.

In some examples, BMS 106 may enable more optimal control of the charging and/or discharging of the battery. For instance, BMS 106 may output an indication of one or more operational characteristics of battery 108 or individual battery cells 116 to charger 104, which may enable charger 104 to more optimally controlling the charging of battery 108 (e.g., by charging particular battery cells 116 and/or controlling the current and voltage level of the individual battery cells 116). Similarly, BMS 106 may output an indication of one or more operational characteristics of battery 108 or individual battery cells 116 to ECU 110 which may enable ECU 110 to control power converter and more optimally discharge battery 108 when powering motor 114 (e.g., by discharging particular battery cells 116 and/or controlling the current and voltage level output by battery 108).

In accordance with one or more techniques of this disclosure, each battery cell of a battery may be coupled to a respective integrated circuit. Each integrated circuit may include one or more sensors to determine one or more operating characteristics of the battery cell to which the integrated circuit is coupled. Each integrated circuit may output a signal indicative of the one or more operational characteristics. A BMS may receive the signals from each of the integrated circuits and may output information about the battery (e.g., to a charger or ECU) based on the received signals. By monitoring each individual battery cell, the BMS may enable more optimal control of the charging and discharging of the battery. In some examples, using waveguides to communicate information between the integrated circuits and the BMS may enable the integrated circuits and BMS to be galvanically isolated. In this way, the integrated circuits and the BMS may communicate with one another while reducing or eliminating the risk of a large voltage damaging or destroying any of the integrated circuits and the BMS.

Figure 2:
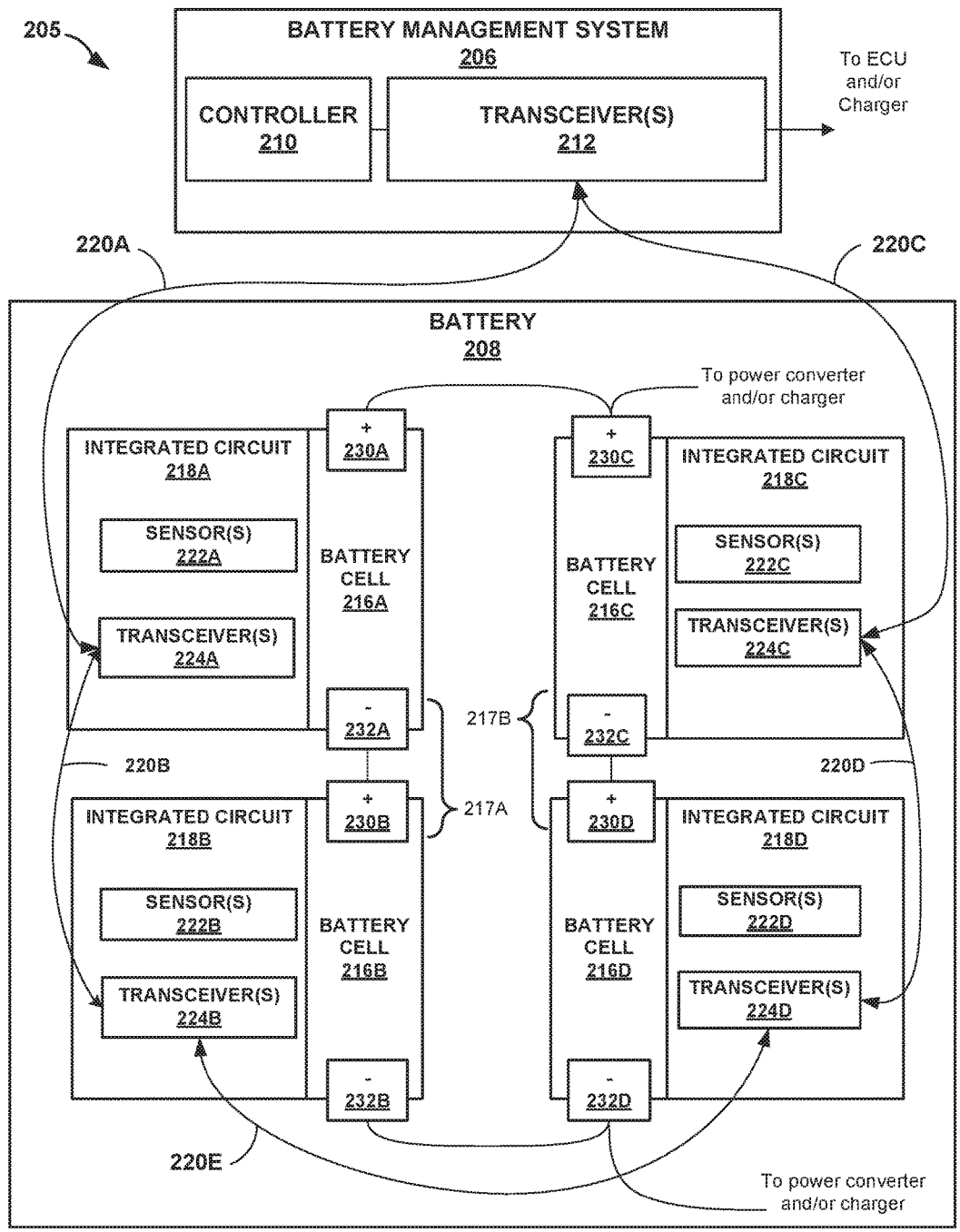
FIG. 2 is a conceptual diagram illustrating details of an example battery system, in accordance with one or more aspects of this disclosure.

FIG. 2 is a conceptual diagram illustrating details of an example battery system, in accordance with one or more aspects of this disclosure. Battery system 205 may be an example of battery system 105 of FIG. 1. As illustrated in FIG. 2, battery system 205 includes BMS 206 or battery 208.

BMS 206 may include controller 210 and one or more transceivers 212. Controller 210 may include one or more processors, including, one or more microprocessors, digital signal processors (DSPs), application specific integrated circuits (ASICs), field programmable gate arrays (FPGAs), or any other equivalent integrated or discrete logic circuitry, as well as any combinations of such components. In some examples, BMS 206 may include memory such as volatile memory (e.g., random access memory, read only memory, etc.) or non-volatile memory (NVM, e.g., flash, MRAM, etc.) which may be used by controller 210 to store information. For example, BMS 206 may include memory which may be used to store data about battery 208 and/or individual battery cells of battery 208. For instance, controller 210 may store values indicative of the operational characteristics of each battery cell of battery 208 to the memory of BMS 206 over a period of time. In some instances, controller 210 may store statistical information (e.g., minimum, maximum, and/or average values) indicative of the operational characteristics of battery 208 or each battery cell of battery 208 to the memory of BMS 206.

In some examples, the one or more transceivers 212 may be configured to output electromagnetic signals and to receive electromagnetic signals. For example, one or more transceivers 212 may output radio frequency (RF) signals to, and receive RF signals from, battery 208. Similarly, one or more transceivers 212 may output RF signals to, and receive RF signals from, ECU 110 of FIG. 1 and/or charger 104 of FIG. 1. In some examples, one or more transceivers 212 may be configured to send and receive RF signals with a frequency between approximately 50 GHz and approximately 300 GHz.

Battery 208 may include a plurality of battery cells 216A-216D (collectively, "battery cells 216") which may be examples of battery cells 116 of FIG. 1. As shown in FIG. 2, each battery cell 216 includes a respective positive terminal of positive terminals 230A-230D (collectively, "positive terminals 230") and a respective negative terminal of negative terminals 232A-232D (collectively, "negative terminals 232"). In some examples, battery cells 216 may be connected to one another in series, in parallel, or a combination therein. For example, as illustrated in FIG. 2, battery cells 216A and 216B may be connected in series (e.g., negative terminal 232A of battery cell 216A may be coupled to positive terminal 230B of battery cell 216B) and may form battery pack 217A. Similarly, battery cells 216C and 216D may be connected in series (e.g., negative terminal 232C of battery cell 216C may be coupled to positive terminal 230D of battery cell 216D) and may form another battery pack 217B. In some examples, two or more battery packs may be connected in parallel. For example, as illustrated by FIG. 2, battery packs 217A and 217B (collectively, "battery packs 217) may be coupled in parallel. For instance, positive terminal 230A of battery cell 216A may be coupled to positive terminal 230C of battery cell 216C and negative terminal 232B of battery cell 216B may be coupled to negative terminal 232D of battery cell 216D. For ease of illustration only, only two battery backs 217 are shown in FIG. 2, and each battery pack 217 is shown with only two battery cells 216. However, it is to be understood that battery 208 may include any number of battery packs 217 connected in parallel and that each battery pack 217 may include any number of battery cells 216 connected in series. In this way, battery 208 may store a large amount of energy and may supply different amounts of current and/or voltage to a load (e.g., motor 114).

Battery 208 may include a plurality of integrated circuits 218A-218D (collectively, "integrated circuits 218") which may be examples of integrated circuits 118 of FIG. 1. Each integrated circuit 218 may be coupled to a respective battery cell 216. Each integrated circuit 218 may include one or more sensors. For example, each integrated circuit 218 may include a respective sensor of sensors 222A-222D (collectively, "sensors 222") configured to determine one or more operational characteristics (e.g., current, voltage, temperature, state of charge, or the like.) of the battery cell 216 to which the respective integrated circuit 218 is coupled. Sensors 222 may include an ammeter, a voltmeter, a thermometer, or any other sensor that may provide information about the operational characteristics of the battery cells 216. In some examples, each integrated circuit 218 may include memory (e.g., volatile memory or non-volatile memory) which may store information about each respective battery cell 216. For example, each integrated circuit 218 may include memory to store data indicative of the operational characteristics of the battery cell 216 to which the integrated circuit is attached. For instance, each integrated circuit 218 may periodically (e.g., at predetermined intervals, or as commanded by BMS 2016) store data indicative of the operational characteristics (e.g., the current temperature, voltage, etc.) of the respective battery cells 216 to the respective memory. In some instance, each integrated circuit may store statistical information (e.g., minimum, maximum, and/or average values) indicative of the operational characteristics of the respective battery cells 216 to the memory of the respective integrated circuit 218.

Each integrated circuit 218 may include one or more transceivers. For example, each integrated circuit 218 may include a respective transceiver of transceivers 224A-224D (collectively, "transceivers 224). In some examples, the one or more transceivers 224 of each integrated circuit 218 may be configured to output electromagnetic signals and to receive electromagnetic signals. For example, each transceiver 224 of each respective integrated circuit 218 may send electromagnetic signals to, and may receive electromagnetic signals from, another integrated circuit 218, BMS 206, or both. For example, as illustrated in FIG. 2, transceiver 224A of integrated circuit 218A may send electromagnetic signals to (and receive electromagnetic signals from) transceiver 212 of BMS 206 as well as transceiver 224B of integrated circuit 218B. In some examples, transceivers 224 may send and receive electromagnetic signals such as RF signals. For example, transceivers 224 may be configured to send and receive RF signals with a frequency between approximately 50 GHz and approximately 300 GHz.

Battery system 205 may include a plurality of waveguides 220A-220E (collectively, "waveguides 220"). Waveguides 220 may be configured to guide electromagnetic signals (e.g., RF signals) in the range of approximately 10 GHz to approximately 500 GHz. In some examples, waveguides 220 may be configured to guide RF signals between approximately 50 GHz and approximately 300 GHz. In some instances, waveguides 220 may be made from an insulating material, such as plastic, glass, or any other suitable insulating material formable into a waveguide. For instance, waveguides 220 may be made from polypropylene, polystyrene, polyethylene, or any other suitable plastic. As such, waveguides 220 may transmit electromagnetic signals between integrated circuits 218 and/or BMS 206 while integrated circuits 218 and BMS 206 remain galvanically isolated. In some examples, a length of one or more waveguides 220 may be greater than 25 centimeters, 50 centimeters, 1 meter, 2 meters, 5 meters, or another suitable distance. For example, a particular battery cell 216 may be located 10 meters or more from BMS 206 such that a waveguide 220 may be 10 meters or more in length to connect a particular integrated circuit 218 that is coupled to the particular battery cell 216 to BMS 206. In some examples, a cross section of waveguides 220 may be any suitable geometry, such as a rectangle, circle, or other suitable shape. In some examples, the dimensions (e.g., cross sectional shape) of waveguides 220 may be selected based on one or more factors, such as the frequency of the RF signals, the length of the waveguide, etc. For example, in examples where the electromagnetic signals include RF signals with a frequency between approximately 100 GHz and approximately 300 GHz, the width of waveguides 220 may be less than or equal to approximately 1 millimeter.

Integrated circuits 218 may communicate with one another, with BMS 206, or both via waveguides 220. For example, one or more transceivers 224 of each integrated circuit 218 may output an electromagnetic signal indicative of the one or more operational characteristics indicative of the respective battery cell 216 to which the respective integrated circuit 218 is coupled. For instance, sensor 222A of integrated circuit 218A may determine one or more operational characteristics (e.g., current, voltage, temperature, etc.) of battery cell 216A. Transceiver 224A may output an electromagnetic signal that indicates the one or more operational characteristics determined by sensor 222A. For instance, transceiver 224A may be coupled to waveguide 220A, such that the electromagnetic signal output by transceiver 224A may propagate through waveguide 220A to transceiver 212 of BMS 206.

In some examples, one or more of integrated circuits 218 may communicate with BMS 206 via one or more other integrated circuits 218. For example, as illustrated by FIG. 2, transceiver 224B of integrated circuit 218B may be coupled to transceiver 224A of integrated circuit 218A. Sensor 222B of integrated circuit 218B may determine one or more operational characteristics of battery cell 216B and transceiver 224B of integrated circuit 218B may output an electromagnetic signal indicative of one or more operational characteristics of battery cell 216B. Waveguide 220B may propagate the electromagnetic signal indicative of one or more operational characteristics of battery cell 216B from transceiver 224B to transceiver 224A, and waveguide 220A may propagate the electromagnetic signal indicative of one or more operational characteristics of battery cell 216B to transceiver 212 of BMS 206.

One or more integrated circuits of the plurality of integrated circuits 218 may include a plurality of transceivers 224 and may be configured to communicate with a plurality of other integrated circuits 218 or at least one other integrated circuit 218 and BMS 206. For example, integrated circuit 218B may include a plurality of transceivers 224B which may each output an electromagnetic signal indicative of one or more operational characteristics of battery cell 216B. For instance, as illustrated by FIG. 2, integrated circuit 218B may include at least two transceivers 224B, a first of which may be coupled to transceiver 224A of integrated circuit 218A via waveguide 220B and a second of which may be coupled to transceiver 224D of integrated circuit 218D via waveguide 220E. In some examples, sensor 222B of integrated circuit 218B may determine one or more operational characteristics of battery cell 216B and transceiver 224B of integrated circuit 218B may output an electromagnetic signal indicative of one or more operational characteristics of battery cell 216B via waveguide 220B, waveguide 220E, or both. Transceiver 224A of integrated circuit 218A may receive an electromagnetic signal from transceiver 224B via waveguide 220B such that integrated circuit 218A may relay the electromagnetic signal to transceiver 212 of BMS 206 via waveguide 220A. Similarly, transceiver 224D of integrated circuit 218D may receive an electromagnetic signal from transceiver 224B via waveguide 220E such that integrated circuit 218D may relay the electromagnetic signal to transceiver 224C of integrated circuit 218C. Likewise, transceiver 224C of integrated circuit 218C may receive an electromagnetic signal from transceiver 224D via waveguide 220D such that integrated circuit 218C may relay the electromagnetic signal to transceiver 212 of BMS 206 via waveguide 220C. In some examples, coupling at least one integrated circuit 218 to a plurality of other integrated circuits 218 may provide redundant connections to BMS 206 should a particular integrated circuit 218 or a particular waveguide 220 fail or be incapable of transmitting electromagnetic signals.

BMS 206 may receive the signals indicative of the one or more operational characteristics of each battery cell 216 from each of the respective integrated circuits 218. In some examples, in response to receiving the signals indicative of the one or more operational characteristics, BMS 206 may output a signal to charger 104 of FIG. 1 to charge at least some of the battery cells 216. Similarly, in some examples, in response to receiving the signals indicative of the one or more operational characteristics, BMS 206 may output a signal to ECU 110 of FIG. 1 indicative of the operational characteristics of battery 108. ECU 110 may receive the information about battery 108 from BMS 206 and may use the information to provide more optimal control of power converter 112. In some examples, BMS 206 may be galvanically isolated from charger 104 and/or ECU 110. For example, BMS 206 may exchange data with charger 104 and/or ECU 110 by sending and/or receiving electromagnetic signals via waveguides.

Figure 3:
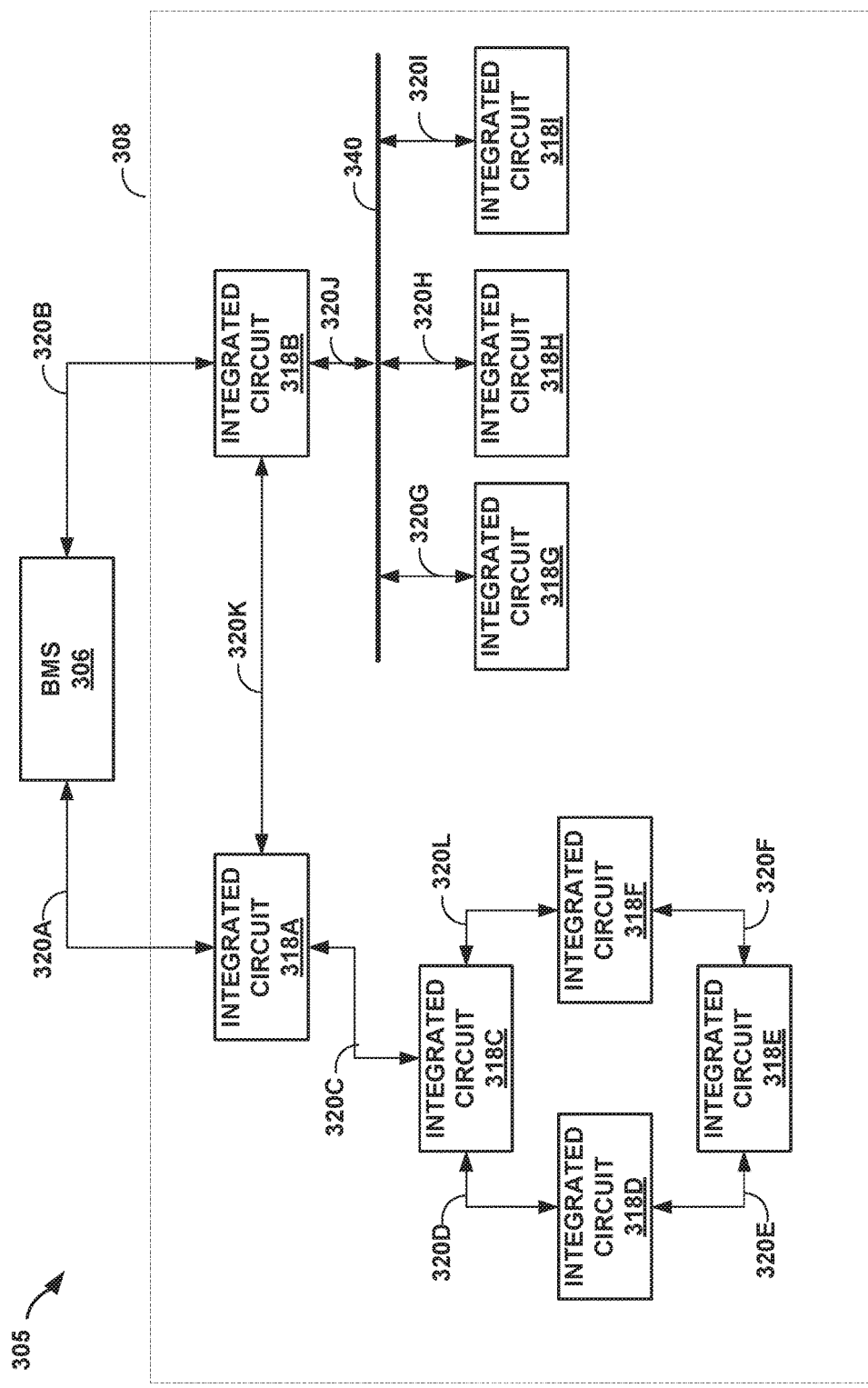
FIG. 3 is a conceptual diagram illustrating details of an example battery system, in accordance with one or more aspects of this disclosure.

FIG. 3 is a conceptual diagram illustrating details of an example battery system, in accordance with one or more aspects of this disclosure. Battery system 305 may be an example of battery system 105 of FIG. 1 and/or battery system 205 of FIG. 2. As illustrated in FIG. 3, battery system 305 includes BMS 306 and battery 308. Battery 308 may include a plurality of battery cells (not shown for simplicity), where each battery cell is coupled to a respective integrated circuit of the plurality of integrated circuits 318A-318I (collectively, "integrated circuits 318"). Integrated circuits 318 may be examples of integrated circuits 118 and 218 of FIGS. 1 and 2, respectively. As described with reference to FIG. 2, each integrated circuit 318 may include one or more sensors that determine one or more operational characteristics of a respective battery cell. In some examples, each integrated circuit 318 may include one or more transceivers. As illustrated in FIG. 3, battery system 305 includes a plurality of waveguides 320A-320L (collectively, "waveguides 320") which may be examples of waveguides 120 and 220 of FIGS. 1 and 2, respectively.

Integrated circuits 318 may communicate with one another or with BMS 306 using one or more network topologies. For example, as illustrated in FIG. 3, battery system 305 may include a tree network topology. For instance, BMS 306 may be coupled directly to integrated circuit 318A using waveguide 320A and may be coupled directly to integrated circuit 318B using waveguide 320B. For example, a first end of waveguide 320A may be coupled to integrated circuit 318A and a second end of waveguide 320A may be coupled to BMS 306. Similarly, a first end of waveguide 320B may be coupled to integrated circuit 318B and a second end of waveguide 320B may be coupled to BMS 306. By coupling integrated circuits 318A and 318B directly to BMS 306, integrated circuits 318A and 318B may output electromagnetic signals indicative of the operational characteristics of the respective battery cells directly to BMS 306. In some examples, BMS 206 may be indirectly coupled to one or more integrated circuits. For example, integrated circuit 318C may output electromagnetic signals with BMS 306 via integrated circuit 318A. For instance, a first end of waveguide 320C may be coupled to integrated circuit 318A and a second end of waveguide 320C may be coupled to integrated circuit 318C. As a result, integrated circuit 318C may output one or more electromagnetic signals indicative of the operational characteristics of the battery cell to which integrated 318C is coupled to integrated circuit 318A, which may forward the electromagnetic signals from integrated circuit 318C to BMS 306.

In some examples, battery system 305 may include a ring network topology. For example, as illustrated in FIG. 3, integrated circuits 318C, 318D, 318E, and 318F may be coupled in a ring structure. In other words, each of integrated circuits 318C, 318D, 318E, and 318F may be directly coupled via waveguides to two of integrated circuits 318C, 318D, 318E, and 318F. For example, integrated circuit 318C may be directly coupled to integrated circuit 318D via waveguide 320D and may be directly coupled to integrated circuit 318F via waveguide 320L. Similarly, integrated circuit 318E may be directly coupled to integrated circuit 318D via waveguide 320E and may be directly coupled to integrated circuit 318F via waveguide 320F. In this way, each of integrated circuits 318C, 318D, 318E, and 318F may output electromagnetic signals via two different paths which may provide redundant paths for transmitting and receiving electromagnetic signals to and from BMS 106.

In some examples, battery system 305 may include a linear bus network topology. For example, as illustrated in FIG. 3, integrated circuit 318B may be coupled to bus 340 via waveguide 320J and integrated circuits 318G, 318H, and 318I may be coupled to bus 340 via waveguides 320G, 320H, and 320I, respectively. In some examples, battery system 305 may include a star network topology. For example, integrated circuit 318A may be coupled to BMS 306 via waveguide 320A, integrated circuit 318B via waveguide 320K, and integrated circuit 318C via waveguide 320C. In this way integrated circuit 318A may act as a hub and may send and receive electromagnetic signals between each of BMS 306, integrated circuit 318B, and integrated circuit 318C.

In some examples, battery system 305 may include a mesh network topology, such as a fully connected mesh network topology or a partially connected mesh network topology. In a fully connected mesh network, each integrated circuit 318 may be connected to every other integrated circuit 318. However, in a fully connected mesh network, each integrated circuit 318 may include many transceivers which may increase the cost and complexity of battery system 305. In some examples, battery system 305 may include an at least partially connected mesh network topology. In a partially connected mesh network topology, one or more of integrated circuit 318 may be directly coupled to at least two other integrated circuits 318. For instance, as illustrated in FIG. 3, integrated circuits 318A-318F are each directly coupled to at least two other integrated circuits 318. In this way, if any particular waveguide 320 or any particular integrated circuit 318 is unable to transmit an electromagnetic signal, the other integrated circuits 318 may still output an electromagnetic signal to BMS 306 via at least one other waveguide 320, thus providing redundant transmission paths.

In some examples, integrated circuits 318 may exchange electromagnetic signals with one another and with BMS 306 using one or more communication protocols. Some examples of communication protocols include a transmission control protocol (TCP), internet protocol (IP), user datagram protocol (UDP), internet control message protocol (ICMP), or the like. In some examples, integrated circuits 318 may communicate with one another or with BMS 306 using TCP/IP. For example, each integrated circuit 318 may be associated with an address. For instance, integrated circuit 318C may send an electromagnetic signal indicative of the operational characteristics of the battery to which integrated circuit 318C is coupled to integrated circuit 318A via waveguide 320C, where the electromagnetic signal may include a destination address and data. In response to receiving the electromagnetic signal, integrated circuit 318A may compare the destination address of the electromagnetic signal to the address associated with integrated circuit 318A and may determine that the destination of the electromagnetic signal received from integrated circuit 318C is BMS 306. As a result, integrated circuit 318A may forward the electromagnetic signal to BMS 306.

Figure 4:
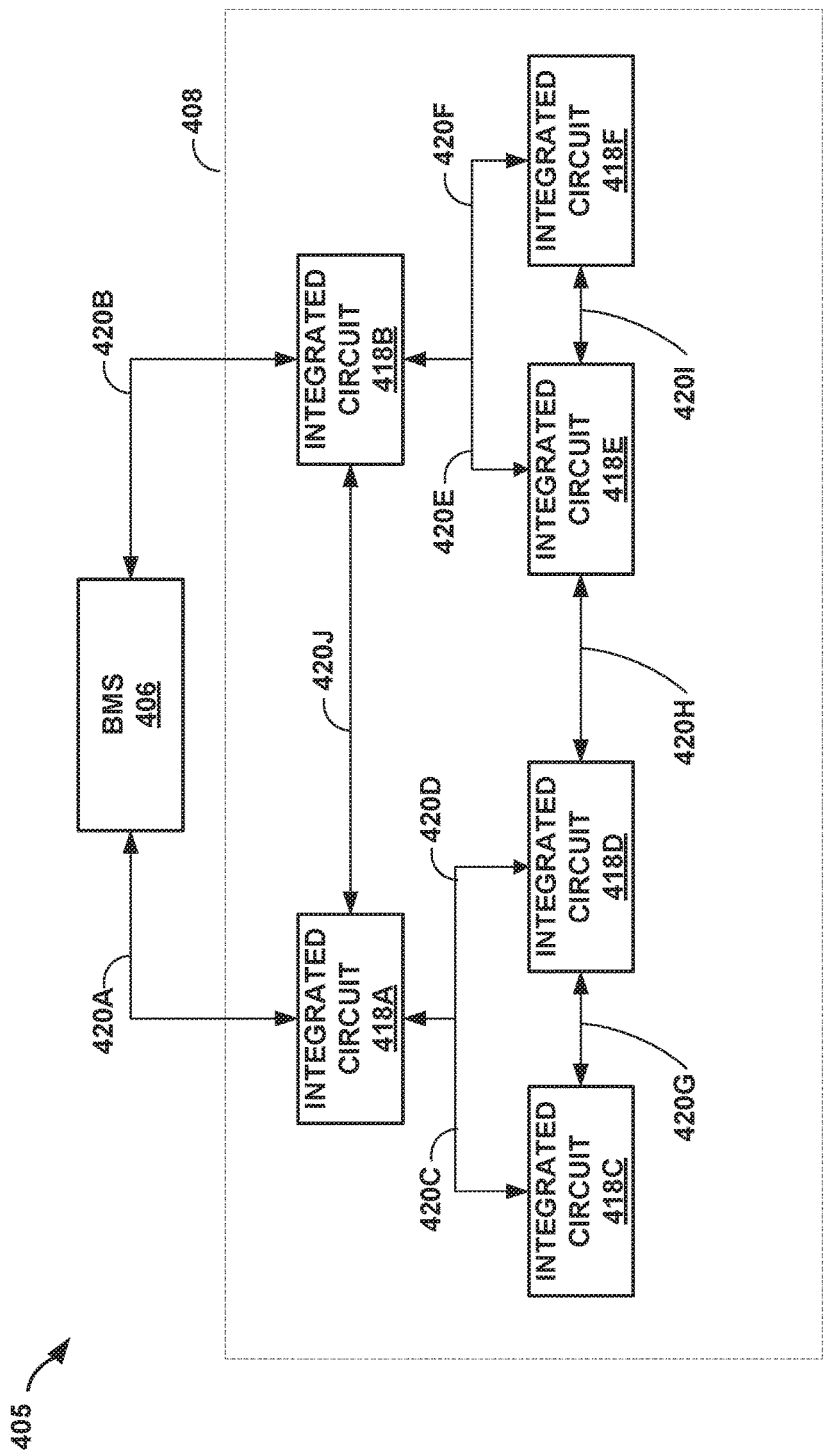
FIG. 4 is a conceptual diagram illustrating details of an example battery system, in accordance with one or more aspects of this disclosure.

FIG. 4 is a conceptual diagram illustrating details of an example battery system, in accordance with one or more aspects of this disclosure. Battery system 405 may be an example of battery system 105 of FIG. 1 and/or battery system 205 of FIG. 2. As illustrated in FIG. 4, battery system 405 includes BMS 406 and battery 408. Battery 408 may include a plurality of battery cells (not shown for simplicity), where each battery cell is coupled to a respective integrated circuit of the plurality of integrated circuits 418A-418F (collectively, "integrated circuits 418"). Integrated circuits 418 may be examples of integrated circuits 118 and 218 of FIGS. 1 and 2, respectively. As described with reference to FIG. 2, each integrated circuit 418 may include one or more sensors that determine one or more operational characteristics of a respective battery cell. In some examples, each integrated circuit 418 may include one or more transceivers. As illustrated in FIG. 4, battery system 405 includes a plurality of waveguides 420A-420J (collectively, "waveguides 420") which may be examples of waveguides 120 and 220 of FIGS. 1 and 2, respectively.

In some examples, each integrated circuit 418 may be directly coupled to a first integrated circuit 418 and may be directly coupled to at least one of BMS 406 or a second integrated circuit 418. For instance, as illustrated in FIG. 4, integrated circuits 418A and 418B are directly coupled to one other and to BMS 406. Similarly, each of integrated circuits 418C-418F are directly coupled to two or more integrated circuits 418. By directly coupling each integrated circuit 418 to a first integrated circuit 418 and at least one of BMS 406 or a second integrated circuit, battery system 405 may include redundant communication paths for transmitting electromagnetic signals from integrated circuits 418 to BMS 406.

Figure 5:
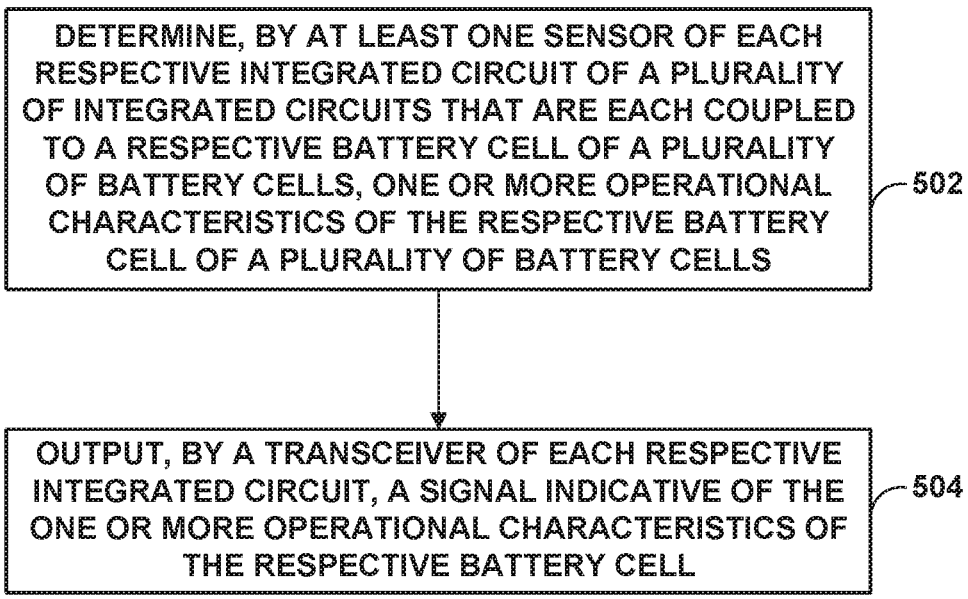
FIG. 5 is a flowchart illustrating exemplary operations of an example battery system, in accordance with one or more aspects of this disclosure.

FIG. 5 is a flowchart illustrating exemplary operations of an example battery system, in accordance with one or more aspects of this disclosure. For purposes of illustration only, the example operations are described below within the context of battery system 205 as shown in FIG. 2.

In some examples, at least one sensor 222 of each respective integrated circuit of a plurality of integrated circuits 218 that are each coupled to a respective battery cell of a plurality of battery cells may determine one or more operational characteristics of the respective battery cell of a plurality of battery cells 216 (502). For example, each of the at least one sensors 222 may include an ammeter, a voltmeter, or a thermometer. In some examples, the one or more operational characteristics may include a current, a voltage, a temperature, or a state of charge.

In some examples, each integrated circuit 218 may include at least one transceiver 224. Each transceiver 224 may be configured to output a signal indicative of the one or more operational characteristics of the respective battery cell 216 to which the respective integrated circuit 218 is coupled (504). Battery system 205 may include a battery management system 206 and a plurality of waveguides 220. In some examples, each transceiver 224 may be configured to output electromagnetic signals (e.g., RF signals) via a waveguide of the plurality of waveguides 220. Each waveguide of the plurality of waveguides 220 may be configured to guide the signals indicative of the one or more operational characteristics of the battery cells 216 between the plurality of integrated circuits 218 and the battery management system 206. Battery management system 206 may be configured to receive the signals indicative of the one or more operational characteristics of each of the battery cells.

BMS 206 may output an indication of one or more operational characteristics of battery 208 or individual battery cells 216 to a charger which may cause the charger to charge battery 208. Similarly, BMS 206 may output an indication of one or more indications of the operational characteristics of battery 108 to an ECU, which may discharge battery 208 by controlling a power converter to provide power to a motor.

The following examples may illustrate one or more aspects of the disclosure.

Example 1

A system comprising: a battery comprising a plurality of battery cells; a plurality of integrated circuits, wherein each integrated circuit of the plurality of integrated circuits is coupled to a respective battery cell of the plurality of battery cells, and wherein each integrated circuit comprises: at least one sensor configured to determine one or more operational characteristics of the battery cell coupled to the integrated circuit; and a transceiver configured to output a signal indicative of the one or more operational characteristics of the battery cell.

Example 2

The system of example 1, further comprising: a battery management system configured to receive the signals indicative of the one or more operational characteristics of each of the battery cells; and a plurality of waveguides configured to guide the signals indicative of the one or more operational characteristics of the battery cells between the plurality of integrated circuits and the battery management system.

Example 3

The system of example 2, wherein the signals indicative of the one or more operational characteristics of the battery cells comprise electromagnetic signals.

Example 4

The system of any combination of examples 2-3 wherein each waveguide of the plurality of waveguides is configured to transmit electromagnetic signals with a frequency between approximately 50 GHz and approximately 300 GHz.

Example 5

The system of any combination of examples 2-4, wherein a width of each waveguide of the plurality of waveguides is less than or equal to approximately 1 millimeter.

Example 6

The system of any combination of examples 2-5, wherein each waveguide of the plurality of waveguides comprises a plastic waveguide.

Example 7

The system of any combination of examples 2-6, wherein: a first end of a first waveguide of the plurality of waveguides is coupled to the battery management system and a second end of the first waveguide is coupled to a first integrated circuit of the plurality of integrated circuits; and a first end of a second waveguide of the plurality of waveguides is coupled to the first integrated circuit and a second end of the second waveguide is coupled to a second integrated circuit of the plurality of integrated circuits.

Example 8

The system of any combination of examples 2-7, wherein: each integrated circuit of the plurality of integrated circuits is directly coupled to a first integrated circuit of the plurality of integrated circuits and is directly coupled to at least one of the battery management system or a second integrated circuit of the plurality of integrated circuits.

Example 9

The system of any combination of examples 2-8, wherein the battery management system and the plurality of integrated circuits are coupled using a network topology comprising a tree topology.

Example 10

The system of any combination of examples 2-9, wherein the battery management system and the plurality of integrated circuits are coupled using a network topology comprising a partially connected mesh topology.

Example 11

The system of any combination of examples 2-10, wherein the battery management system and each integrated circuit are configured to communicate with one another via TCP/IP.

Example 12

The system of any combination of examples 1-11, wherein each battery cell supplies power to the respective integrated circuit coupled to the respective battery cell.

Example 13

A method comprising: determining, by at least one sensor of each respective integrated circuit of a plurality of integrated circuits that are each coupled to a respective battery cell of a plurality of battery cells, one or more operational characteristics of the respective battery cell of a plurality of battery cells; and outputting, by a transceiver of each respective integrated circuit, a signal indicative of the one or more operational characteristics of the respective battery cell.

Example 14

The method of example 13, further comprising: guiding, by a plurality of waveguides, the signals indicative of the one or more operational characteristics of the battery cells between the plurality of integrated circuits and a battery management system; and receiving, by the battery management system, the signals indicative of the one or more operational characteristics of each of the battery cells.

Example 15

The method of example 14, wherein the signals indicative of the one or more operational characteristics of the battery cells comprise electromagnetic signals.

Example 16

The method of any combination of examples 14-15, wherein: a first end of a first waveguide of the plurality of waveguides is coupled to the battery management system and a second end of the first waveguide is coupled to a first integrated circuit of the plurality of integrated circuits; and a first end of a second waveguide of the plurality of waveguides is coupled to the first integrated circuit and a second end of the second waveguide is coupled to a second integrated circuit of the plurality of integrated circuits.

Example 17

The method of any combination of examples 14-16, wherein: each integrated circuit of the plurality of integrated circuits is directly coupled to a first integrated circuit of the plurality of integrated circuits and is directly coupled to at least one of the battery management system or a second integrated circuit of the plurality of integrated circuits.

Example 18

The method of any combination of examples 14-17, wherein the battery management system and the plurality of integrated circuits are coupled using a network topology comprising a tree topology.

Example 19

The method of any combination of examples 14-18, wherein the battery management system and the plurality of integrated circuits are coupled using a network topology comprising a partially connected mesh topology.

Example 20

The method of any combination of examples 13-19, wherein each battery cell supplies power to the respective integrated circuit coupled to the respective battery cell.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), non-volatile memory (e.g., flash, MRAM, ReRAM, or the like), a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A system comprising:
   a battery comprising a plurality of battery cells; and
   a plurality of integrated circuits, wherein each integrated circuit of the plurality of integrated circuits is coupled to a respective battery cell of the plurality of battery cells, and wherein each integrated circuit comprises:
      at least one sensor configured to determine one or more operational characteristics of the respective battery cell coupled to the integrated circuit; and
      a transceiver configured to output a signal indicative of the one or more operational characteristics of the respective battery cell coupled to the integrated circuit;
   a plurality of waveguides configured to guide the signals indicative of the one or more operational characteristics of the battery cells between the plurality of integrated circuits and a battery management system,
   wherein each waveguide of the plurality of waveguides is configured to transmit radio frequency electromagnetic signals with a frequency between approximately 50 GHz and approximately 300 GHz.

2. The system of claim 1, further comprising:
   the battery management system,
   wherein the battery management system is configured to receive the signals indicative of the one or more operational characteristics of each of the plurality of battery cells.

3. The system of claim 1, wherein a width of each waveguide of the plurality of waveguides is equal to approximately 1 millimeter.

4. The system of claim 1, wherein each waveguide of the plurality of waveguides comprises a plastic waveguide.

5. The system of claim 1, wherein:
   a first end of a first waveguide of the plurality of waveguides is coupled to the battery management system and a second end of the first waveguide is coupled to a first integrated circuit of the plurality of integrated circuits; and
   a first end of a second waveguide of the plurality of waveguides is coupled to the first integrated circuit and a second end of the second waveguide is coupled to a second integrated circuit of the plurality of integrated circuits.

6. The system of claim 1, wherein:
   each integrated circuit of the plurality of integrated circuits is directly coupled to a first integrated circuit of the plurality of integrated circuits and is directly coupled to at least one of the battery management system and a second integrated circuit of the plurality of integrated circuits.

7. The system of claim 1, wherein the battery management system and the plurality of integrated circuits are coupled using a network topology comprising a tree topology.

8. The system of claim 1, wherein the battery management system and the plurality of integrated circuits are coupled using a network topology comprising a partially connected mesh topology.

9. The system of claim 1, wherein:
   the battery management system and each integrated circuit of the plurality of integrated circuits are configured to communicate with one another via TCP/IP.

10. The system of claim 1, wherein each battery cell of the plurality of battery cells is configured to supply power to the respective integrated circuit coupled to the respective battery cell.

11. A method comprising:
   determining, by at least one sensor of each respective integrated circuit of a plurality of integrated circuits that are each coupled to a respective battery cell of a plurality of battery cells, one or more operational characteristics of the respective battery cell of the plurality of battery cells; and
   outputting, by a transceiver of each respective integrated circuit, a radio frequency (RF) electromagnetic signal indicative of the one or more operational characteristics of the respective battery cell of the plurality of battery cells; and
   guiding, by a plurality of waveguides, the signals indicative of the one or more operational characteristics of the battery cells between the plurality of integrated circuits and a battery management system,
   wherein the RF electromagnetic signals are defined by a frequency between approximately 50 GHz and approximately 300 GHz.

12. The method of claim 11, further comprising:
   receiving, by the battery management system, the signals indicative of the one or more operational characteristics of each battery cell of the plurality of battery cells.

13. The method of claim 11, wherein:
   a first end of a first waveguide of the plurality of waveguides is coupled to the battery management system and a second end of the first waveguide is coupled to a first integrated circuit of the plurality of integrated circuits; and
   a first end of a second waveguide of the plurality of waveguides is coupled to the first integrated circuit and a second end of the second waveguide is coupled to a second integrated circuit of the plurality of integrated circuits.

14. The method of claim 11, wherein:
   each integrated circuit of the plurality of integrated circuits is directly coupled to a first integrated circuit of the plurality of integrated circuits and is directly coupled to at least one of the battery management system and a second integrated circuit of the plurality of integrated circuits.

15. The method of claim 11, wherein the battery management system and the plurality of integrated circuits are coupled using a network topology comprising a tree topology.

16. The method of claim 11, wherein the battery management system and the plurality of integrated circuits are coupled using a network topology comprising a partially connected mesh topology.

17. The method of claim 11, wherein each battery cell supplies power to the respective integrated circuit coupled to the respective battery cell.

18. The system of claim 1, wherein:
   each waveguide of the plurality of waveguides is directly coupled to a respective integrated circuit of the plurality of integrated circuits, and
   each waveguide of the plurality of waveguides is directly coupled to the battery management system or another integrated circuit of the plurality of integrated circuits.

19. The method of claim 11, wherein:
   each waveguide of the plurality of waveguides is directly coupled to a respective integrated circuit of the plurality of integrated circuits, and
   each waveguide of the plurality of waveguides is directly coupled to the battery management system or another integrated circuit of the plurality of integrated circuits.

* * * * *